United States Patent [19]

Benson et al.

[11] Patent Number: 4,867,402
[45] Date of Patent: Sep. 19, 1989

[54] RECEPTACLE FOR EYEGLASSES

[76] Inventors: Steven B. Benson, 17932 Fruitport Rd.; Wayne R. Ritchie, 16308 Pinewood, both of Spring Lake, Mich. 49456

[21] Appl. No.: 233,671

[22] Filed: Aug. 19, 1988

[51] Int. Cl.⁴ .............................................. F16B 47/00
[52] U.S. Cl. ................................ 248/206.2; D16/129; 248/309.3; 248/902
[58] Field of Search ............ 248/DIG. 2, 206.2, 206.3, 248/309.3, 311.2; D16/129; 206/5

[56] References Cited

U.S. PATENT DOCUMENTS

| 993,404 | 5/1911 | Price | 248/DIG. 2 X |
| 2,467,251 | 4/1949 | Bowman | 248/DIG. 2 X |
| 2,958,495 | 11/1960 | Foster | 248/DIG. 2 X |
| 3,195,731 | 7/1965 | Bomar, Jr. | 248/DIG. 2 X |
| 3,895,718 | 7/1975 | Seiller | 248/DIG. 2 X |

FOREIGN PATENT DOCUMENTS

| 1258283 | 3/1961 | France | 248/DIG. 2 |
| 0415105 | 12/1966 | Switzerland | 248/DIG. 2 |

Primary Examiner—Ramon O. Ramirez
Attorney, Agent, or Firm—Waters, Morse & Harrington

[57] ABSTRACT

A receptacle for eyeglasses and sunglasses is attachable to the windshield of an automobile with a suction cup. The configuration of the receptacle provides a bearing abutment that engages the windshield below the suction cup, and removes any tendency to twist the suction cup out of engagement. The configuration of the device further adapts it to either formation from flat stock, or to injection molding.

5 Claims, 1 Drawing Sheet 4,867,402

RECEPTACLE FOR EYEGLASSES

BACKGROUND OF THE INVENTION

Drivers of automobiles frequently find it necessary to change the eyeglasses they are wearing, or to put on sunglasses. Many drivers have a pair that they use especially for the distance vision involved in driving, and wear these only when they are behind the steering wheel. The change from one pair to another usually involves stuffing one pair into a convenient pocket, and pulling out the other either from another pocket, or from some storage location. When in a hurry, this is often done as a one-handed operation while the car is in motion. Obviously, the storage position of the glasses should be in a fixed place easily within reach from the driver's position. It should not be necessary to take the eyes off the road during this maneuver. The same problem arises in the use of sunglasses. The driver often does not realize he needs them until making a turn and finding the sun directly in his eyes.

Storage locations for the eyeglasses that are not momentarily in use have included loose placement on the flat area above the dashboard, in the glove compartment, drawers, and the various compartments that are customarily provided between the front seats of an automobile. None of these give the ready accessibility that is required for a one-handed change operation that does not require the driver to take his attention from the road. Some eyeglasses and sunglasses are stored on the visor above the steering wheel, and it is extremely difficult to manipulate eyeglasses in this position without distraction. The present invention is directed at providing an inexpensive device that will function as a storage receptacle for eyeglasses, and capable of installation on practically any vehicle.

SUMMARY OF THE INVENTION

The receptacle provided by this invention is mounted on the windshield of an automobile, preferably below lines extending from the driver's eye position to the outline of the hood and front fenders. When located in this area on the windshield, the presence of the device does not obstruct the vision in any area important to the driving of the automobile. The device is secured in place on the windshield by a suction cup, and is stabilized by a bearing arm that removes any twisting moment from the cup. The configuration is adapted to fabrication by injection molding, or by forming from flat stock. Molding can be accomplished by the use of dies without movable cores. A central "U"-shaped portion has an extension from one leg for receiving the suction cup. It is offset at an angle to approach the slant of the windshield. This extension continues beyond the cup, and terminates in an offset providing a surface bearing against the windshield. The other leg of the "U" supports a bracket receiving the eyeglasses

DESCRIPTION OF THE PREFERRED EMBODIMENT

Figures 2, 4, 5:
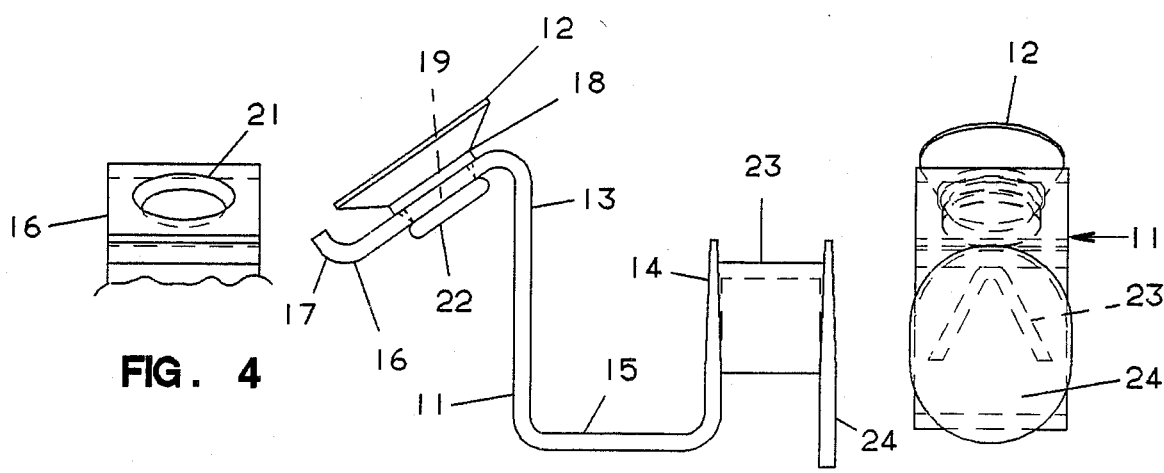
FIG. 2 is a side elevation of the receptacle.
FIG. 4 is a view of the mounting panel without the suction cup, from the windshield side of the device.
FIG. 5 is a view of the device, in the position in which it would be seen from the seat of the automobile.

Referring to the drawings, the pair of sunglasses 10 is shown supported by the receptacle generally indicated at 11. It is supported on a slanted windshield with the aid of a suction cup 12. Referring to FIG. 2, the device has a central "U"-shaped portion formed by the normally vertical panels 13 and 14, interconnected by the lower panel 15. The mounting panel 16 is an extension from the upper end of the panel 13, and forms an interior acute angle selected to place the panels 13 and 14 in a vertical position. This relationship need only be roughly approximate. The outer extremity of the mounting panel 16 is offset at 17 to provide a bearing abutment that engages the windshield when the device is in the FIG. 2 position, and the suction cup is compressed to its customary holding condition. The cup has a neck 18 with a narrow portion 19 received in the bevelled hole 21 in the mounting panel 16. The button end 22 of the neck 18 is forced through the hole 21 to the FIG. 2 position.

Figure 1:
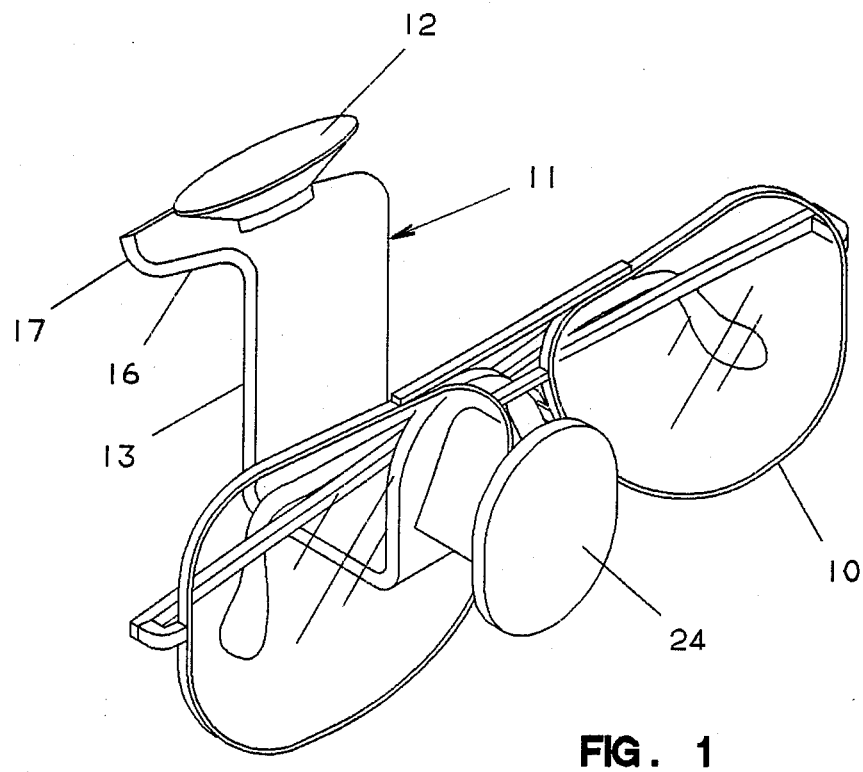
FIG. 1 is a perspective view of the receptacle in the position in which it would be secured to the windshield, showing a pair of sunglasses in storage.

The panel 14 of the central "U" configuration supports the inverted "V" section 23. This is the portion of the device that actually carries the sunglasses or eyeglasses, which rest at their bridge on the device as shown in FIG. 1. The apex of the section 23 is upward. The outer end of this section is closed off by the abutment panel 24, and it is preferable that both the panel 24 and the panel 14 extend laterally outward from the "V" section 23 at all points. The space between the panels 13 and 14 receives the crossed bows of the glasses, as shown in FIG. 1.

Figure 3:
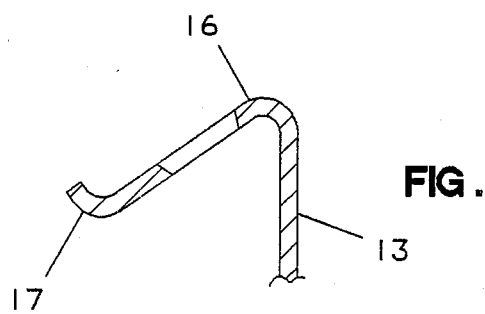
FIG. 3 is sectional side elevation through the hole that receives the suction cup.

The overall configuration of the device is adapted for manufacture either from formed flat stock, or as a unitary injection molding from any convenient plastic material. A transparent plastic is preferable, since this obviously provides a minimum of visual obstruction. The device as illustrated in FIGS. 2 and 4 is adapted particularly for injection molding with a die that requires no movable core components. The opposite sides of the panel 24 are provided with a central flattened area to facilitate the placement of a parting line of the die components. The parting line will normally extend outward from the lower extremities of the "V" section, and follow around an edge of the central "U" configuration, and continue around an edge of the mounting panel 16. The die sections will separate vertically with respect to each other, as molded in the position shown in FIG. 2. This separation movement requires that the right wall of the hole 21 in the mounting panel be also oriented, so that the portion of the die forming this opening will pull free without tearing the molded piece. The angle of the bevel of the hole 21 is selected so that the right side of it, as shown in FIG. 3, is close to vertical, or slightly clockwise from vertical. The die projection forming this hole will then be a part of the upper die section.

Using a variety of conventional plastic materials, such as acrylic or polycarbonate, adequate strength and stiffness has been found to follow from the use of material approximately an inch in width, and three thirty-seconds (3/32) of an inch in thickness. Adequate clearance for the support of the eyeglasses or sunglasses seems to follow from establishing the length of the panel 13 at about an inch and a half (1½"), and the panel 14 at approximately one and one-eighth (1⅛) inches. The space between them established by the panel 15 should be approximately one (1) inch, with the axial length of the "V" section 23 at about one-half (½) inch to allow clearance for the usual bridge structure associated with eyeglasses and sunglasses. The diameter of the suction cup 12 should be about three quarters (¾) of an inch to provide adequate holding power. This cup, including the neck 18 and the button end 22, are of highly flexible material, and the presence of the bearing abutment 17 removes any tendency to twist the neck of the suction cup in a clockwise direction, as viewed in FIG. 2. The effectiveness of the suction cup is increased considerably by this arrangement, since the loading on it is restricted to direct force.

The panel 24 has been found to have additional utility. Since it faces the occupants of the car, it can function as advertising space. The continued presence of this space directly in view creates excellent exposure to a compact advertising logo or trademark, along with possible reference information.

We claim:

1. A receptacle for holding eyeglasses, comprising:
   a central "U"-shaped configuration providing spaced parallel panels and a normally horizontal lower connecting panel, one of said parallel panels having a front top edge, and the other of said parallel panels having a central portion;
   a mounting panel integral with said front top edge of one of said parallel panels, and forming an acute angle therewith, said mounting panel having means adapted to engage a suction cup;
   a "V"-shaped portion integral with said central portion of the other of said parallel panels, and extending therefrom on an axis perpendicular thereto, said portion being disposed with the apex thereof normally upward; and
   an abutment panel integral with the opposite end of said "V"-shaped portion from said other parallel panel, and parallel thereto.

2. A receptacle as defined in claim 1, wherein said mounting panel means includes a bevelled hole constituting said means for engaging a suction cup.

3. A receptacle as defined in claim 1, wherein said mounting panel has an end portion angularly offset to provide a bearing abutment on the opposite side of said mounting panel from said "U"-shaped configuration.

4. A receptacle as defined in claim 1, wherein said abutment panel is disposed at the opposite end of said "V"-shaped portion from said connecting panel.

5. A receptacle as defined in claim 4, wherein said other and abutment panels extend laterally from the entirety of the opposite ends, respectively, of said "V"-shaped portion.

* * * * *